United States Patent
Puckett et al.

(10) Patent No.: US 11,988,774 B2
(45) Date of Patent: May 21, 2024

(54) INTEGRATED PHOTONICS AIR DATA SYSTEM

(71) Applicant: Honeywell International Inc., Charlotte, NC (US)

(72) Inventors: Matthew Wade Puckett, Phoenix, AZ (US); Steven Tin, Edina, MN (US); Chad Fertig, Bloomington, MN (US)

(73) Assignee: Honeywell International Inc., Charlotte, NC (US)

( * ) Notice: Subject to any disclaimer, the term of this patent is extended or adjusted under 35 U.S.C. 154(b) by 868 days.

(21) Appl. No.: 17/080,102

(22) Filed: Oct. 26, 2020

(65) Prior Publication Data

US 2022/0128668 A1    Apr. 28, 2022

(51) Int. Cl.
| | |
|---|---|
| *G01S 7/481* | (2006.01) |
| *G01N 21/47* | (2006.01) |
| *G02B 6/12* | (2006.01) |
| *G02B 6/42* | (2006.01) |
| *G02F 1/225* | (2006.01) |

(52) U.S. Cl.
CPC ............ *G01S 7/4818* (2013.01); *G01N 21/47* (2013.01); *G02B 6/12007* (2013.01); *G02B 6/4201* (2013.01); *G02F 1/225* (2013.01); *G02F 2203/055* (2013.01)

(58) Field of Classification Search
CPC ...... G01S 7/4818; G01S 7/4811; G01S 17/89; G01N 21/47; G01N 21/4795; G02B 6/12007; G02B 6/4201; G02F 1/225; G02F 2203/055; G01D 5/35358; G01B 9/02051; G01B 9/02002

See application file for complete search history.

(56) References Cited

U.S. PATENT DOCUMENTS

| 7,522,291 B2 | 4/2009 | Hays et al. |
| 9,086,488 B2 | 7/2015 | Tchoryk, Jr. et al. |
| 10,012,732 B2 | 7/2018 | Eichenholz et al. |
| (Continued) | | |

OTHER PUBLICATIONS

Gao, "Towards High-Performance Silicon Photonics Tunable Lasers", Feb. 27, 2019, p. 1, www.neophotonics.com/silicon-photonics-tunable-lasers/.

(Continued)

*Primary Examiner* — Yuqing Xiao
*Assistant Examiner* — Joseph C Fritchman
(74) *Attorney, Agent, or Firm* — Fogg & Powers LLC

(57) ABSTRACT

Embodiments relating to an integrated photonics air data system are disclosed. A light beam from a laser source is routed to a plurality of tunable optical filters operative to transmit the light beam to one of a plurality of emitting grating couplers at any given time. The tunable optical filters are configured such that the light beam is emitted into the region of interest at different times from each of the emitting grating couplers. A passive optical filter array is configured to receive scattered light from the emitted light beam. The passive optical filter array comprises a plurality of optical notch filters operative for frequency selection, and a plurality of optical detectors each respectively coupled to an output of one of the optical notch filters. The passive optical filter array is operative to perform frequency spectrum decomposition of the received scattered light into a plurality of signals.

19 Claims, 9 Drawing Sheets

(56) References Cited

U.S. PATENT DOCUMENTS

| | | | |
|---|---|---|---|
| 10,591,802 B2* | 3/2020 | Sun | G02F 1/2955 |
| 10,627,485 B2 | 4/2020 | Swanson | |
| 10,627,517 B2* | 4/2020 | Yaacobi | G01S 7/4814 |
| 10,788,340 B1* | 9/2020 | Tin | G01S 17/88 |
| 11,442,148 B2* | 9/2022 | Tin | G02B 6/4215 |
| 2009/0046289 A1 | 2/2009 | Caldwell et al. | |
| 2018/0306925 A1* | 10/2018 | Hosseini | G01S 7/4814 |
| 2019/0004151 A1 | 1/2019 | Abediasl et al. | |
| 2019/0033522 A1 | 1/2019 | Baba et al. | |
| 2019/0377135 A1* | 12/2019 | Mansouri Rad | G01S 7/4811 |
| 2020/0088876 A1* | 3/2020 | Tanemura | G01S 7/006 |

OTHER PUBLICATIONS

Happich, "Photonic chip steers light without any moving parts", Jan. 15, 2020, pp. 1 through 2, https://www.eenewseurope.com/news/photonic-chip-steers-light-without any-moving-parts.

Koifman, "LiDAR News: Voyant Photonics, Aeye", Image Sensors World, Jul. 19, 2019, pp. 1 through 4, image-sensors-world.blogspot.com/2019/07/lidar-news-voyant-photonics-aeye.html.

Poulton et al., "MIT and DARPA Pack Lidar Sensor Onto Single Chip", IEEE Spectrum, Aug. 4, 2016, pp. 1 through 6, https://spectrum.ieee.org/tech-talk/semiconductors/optoelectronics/mit-lidar-on-a-chip.

Sun et al., "Si Photonics for Practical LiDAR Solutions", Applied Sciences 2019, 9, , Oct. 10, 2019, pp. 1 through 25, MDPI, www.mdpi.com/journal/applsci.

Puckett, Matthew W. et al., "Thermal Imaging With an Integrated Photonics Chip", U.S. Appl. No. 16/704,862, filed Dec. 5, 2019, pp. 1 through 28, Published: US.

Tin, Steven et al., "High Temperature and High Dynamic Bandwidth Photonic Sensor for Gas Flow Rate, Temperature, and Pressure Measurement", U.S. Appl. No. 16/569,581, filed Sep. 12, 2019, pp. 1 through 34, Published: US.

European Patent Office, "Extended European Search Report from EP Application No. 21204521.5", from Foreign Counterpart to U.S. Appl. No. 17/080,102, dated Mar. 23, 2022, pp. 1 through 5, Published: EP.

\* cited by examiner

INTEGRATED PHOTONICS AIR DATA SYSTEM

BACKGROUND

Optical detection systems such as light detection and ranging (lidar) systems are effective at analyzing air data in a surrounding environment. Oftentimes, these lidar systems are implemented in vehicles, such as aircraft, and are useful in converting air data measurements to various air data parameters that can aid the operator of a vehicle as it travels.

Lidar systems operate by emitting light beams in various areas of interest outward from the vehicle. As the emitted light beams collide with anomalies in the environment, the light is scattered consistent with principles of Mie and Raleigh scattering. The backscattered light can then be detected by the lidar system, and the differences between the emitted and backscattered light (e.g., frequency shift) are analyzed to determine relevant information about the surrounding environment.

SUMMARY

In one embodiment, an integrated photonics chip is provided. The integrated photonics chip comprises a photonics substrate and a laser source operatively coupled to the photonics substrate. The laser source is operative to emit a light beam. The integrated photonics chip further comprises a plurality of tunable optical filters on the photonics substrate, in which the tunable optical filters are in optical communication with each other and with the laser source. The integrated photonics chip further comprises a plurality of emitting grating couplers on the photonics substrate. The emitting grating couplers are each respectively coupled to an output of one of the tunable optical filters. Each emitting grating coupler is configured to emit the light beam received from the output of the respective tunable optical filter into a region of interest in different directions. The integrated photonics chip further comprises at least one receiving grating coupler on the photonics substrate, in which the receiving grating coupler is configured to receive scattered light from the region of interest. The integrated photonics chip further comprises a passive optical filter array on the photonics substrate and in optical communication with the receiving grating coupler. The passive optical filter array is configured to receive the scattered light from the receiving grating coupler. The passive optical filter array comprises a plurality of optical notch filters operative for frequency selection and a plurality of optical detectors each respectively coupled to an output of one of the optical notch filters. Each of the optical notch filters is configured to pass the received scattered light at a corresponding wavelength range to a respective one of the optical detectors, in which each corresponding wavelength range is distinct. The passive optical filter array is operative to perform frequency spectrum decomposition of the received scattered light into a plurality of signals. The light beam emitted from the laser source is routed to one or more of the tunable optical filters, which are operative to allow transmission of the light beam to one of the emitting grating couplers at any given time, such that the light beam is emitted into the region of interest at different times from each of the emitting grating couplers.

BRIEF DESCRIPTION OF THE DRAWINGS

Exemplary features of the present disclosure, its nature and various advantages will be apparent from the accompanying drawings and the following detailed description of various embodiments. Non-limiting and non-exhaustive embodiments are described with reference to the accompanying drawings, wherein like labels or reference numbers refer to like parts throughout the various views unless otherwise specified. The sizes and relative positions of elements in the drawings are not necessarily drawn to scale. For example, the shapes of various elements are selected, enlarged, and positioned to improve drawing legibility. The particular shapes of the elements as drawn have been selected for ease of recognition in the drawings. One or more embodiments are described hereinafter with reference to the accompanying drawings in which.

Figure 1:
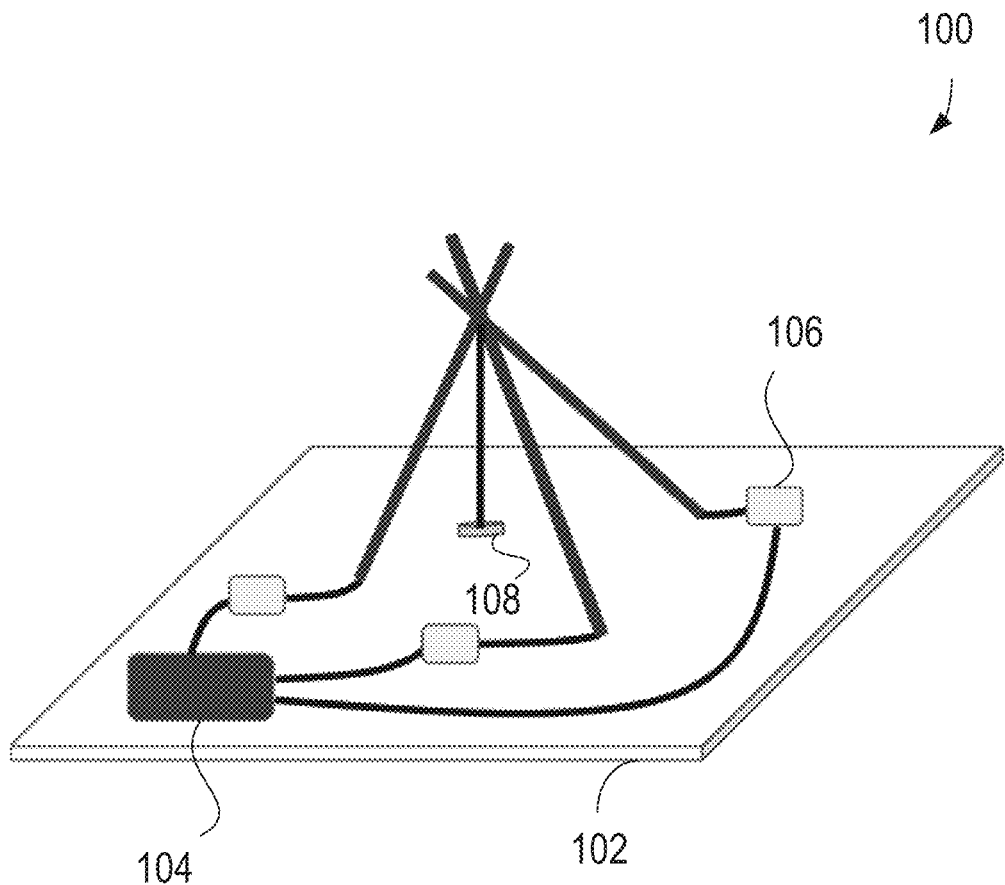
FIG. 1 is a schematic perspective view of an optical air data system configured to measure air data parameters based on emitted signals as described in one or more embodiments.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

Traditional air data systems suffer from burdensome configurations that can unnecessarily increase the power, size, and weight impacts of these systems. For example, in a typical light detection and ranging (lidar) system, at least three laser beams of different directions are emitted into a region of interest to extract air data information. While a multiple-laser solution achieves the desired outcome of emitting multiple light beams, it may also demand significant power consumption to maintain laser activity. Additionally, many traditional lidar systems employ discrete optical components with large spatial dimensions, which may be spread throughout the vehicle. Not only can such systems require a significant cost burden to maintain, but may be impractical or impossible to implement on smaller or more sensitive vehicles, such as urban air mobility (UAM) vehicles.

The embodiments described herein address these problems via an improved optical air data system to determine air data parameters about a vehicle. The air data system, which can be implemented on a microchip, can amount to reduced size, weight, power, and cost when compared to traditional lidar-based systems. Additionally, the reduced size of the described air data system enables implementation on large and small vehicles alike, for example large commercial aircraft as well as smaller aircraft (e.g., UAM vehicles).

Exemplary embodiments of the optical air data system include a light emission system such as a laser configured to transmit a time-multiplexed signal (e.g., light beam) to a plurality of tunable optical filters. The tunable optical filters are configured so that the light beam only passes through a tunable optical filter at a time. This may be achieved via a switch coupled to the tunable optical filters that directs the resonance frequency of the tunable optical filter to match the frequency of the laser for a designated time interval. Time-multiplexing the light beam from a single laser enables the reduction of the power and cost burdens of utilizing the air data system. In other embodiments, the light emission system comprises a light detection and ranging (lidar) system.

Furthermore, certain embodiments utilize a passive optical filter array comprising a plurality of notch filters to extract and process backscattered light received from light beams transmitted to free space. Each of the notch filters are configured to pass a portion of the received light spectrum. The spectrum portions that do not pass are cascaded through the optical filter array until they reach a notch filter that is configured to pass the respective spectrum portion. The optical filter array thus decomposes the received light spectrum into organized spectrum portions based on frequency or wavelength, which then can be sent to a processing system to determine air data parameters from the received light spectrum. The use of the optical filter array, particularly in the context of micro-lidar integrated photonics, enables for an air data system with increased accuracy and nuance than traditional air data systems.

With reference to the Figures, FIG. 1 depicts an embodiment of an optical air data system 100 as described above. Air data system 100 is implemented on a substrate 102 comprised of a silicon or analogous material. Substrate 102 can further include a chip, such as an integrated photonics chip. In some embodiments, the chip can be a microchip with a size approximately of 1 mm by 1 mm. Substrate 102 further includes an optical signal generator such as a laser source 104, which can be configured to transmit a continuous-wave signal at a frequency to a plurality of tunable optical filters 106. While three tunable optical filters 106 are illustrated in FIG. 1, the number of tunable optical filters can be extended to any number as required by air data system 100. The system components described in FIG. 1 (and FIG. 2) can be coupled by free space optics or by optical waveguides (e.g., optical fiber waveguides).

Each tunable optical filter 106 is configured to receive light from laser source 104; however, whether the laser light passes through a designated optical filter 106 depends on how the tunable optical filter is tuned. When the tunable optical filter 106 is tuned such that it transmits only optical signals at the frequency of laser source 104, then the light from the laser source 104 can pass through the tunable optical filter 106 and subsequently be emitted in a distinct vector into free space. Only one tunable optical filter 106 should be tuned to the resonance frequency of laser source 104 at a given time. This way, the light from laser source 104 only passes through one correctly tuned tunable optical filter 106 at a time. At a later time period, which can be very close to the earlier time period, another tunable optical filter is tuned to frequency of laser source 104 and the previous tunable optical filter is tuned to a different frequency such that light from laser source 104 no longer passes through that tunable optical filter.

Figure 2:
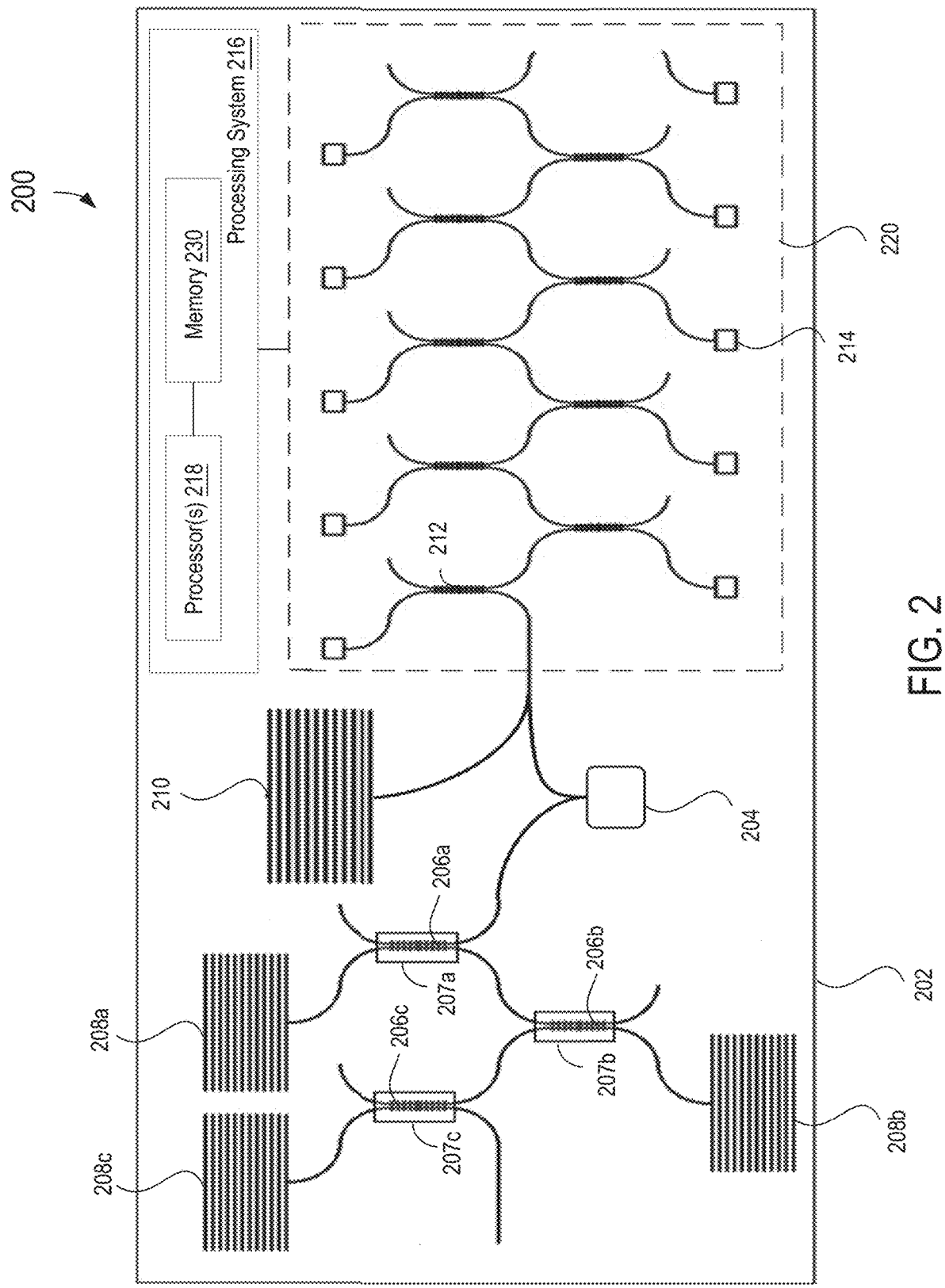
FIG. 2 is a schematic top view of an optical air data system including a plurality of tunable optical filters and an optical filter array as described in one or more embodiments.
Figure 3:
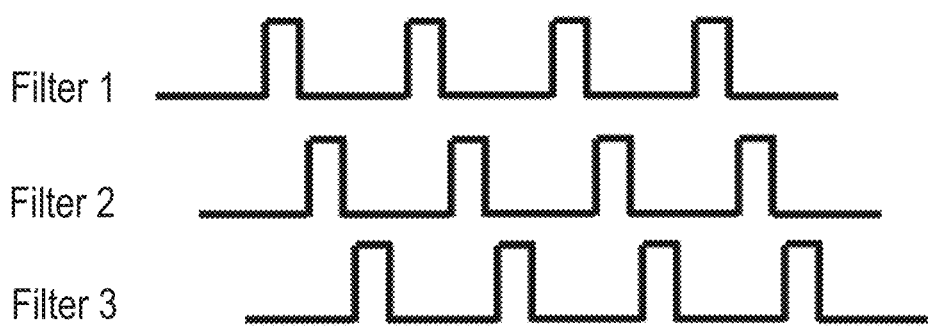
FIG. 3 is a diagram depicting the voltage output per time of three tunable optical filters as described in one or more embodiments.

In some embodiments, and as described in further detail with respect to FIGS. 2-3, the tunable optical filters are tuned such that in a default (inactive) state each filter passes light at a frequency different from the frequency of laser source 104. A tunable optical filter can then be activated by tuning the frequency of the filter to match the frequency of laser source 104. For example, each tunable optical filter can be coupled to a switch directed by a controller or microcontroller (not shown in FIG. 1) to control the tuning of each tunable optical filter. The controller can be configured to send a command signal to a designated tunable optical filter to be set to an active state, and can further direct an activated tunable optical filter to be set to the default (deactivated) state.

Consistent with lidar-based principles, the signals passing through tunable optical filters 106 can be emitted in a distinct vector in free space. When the signals collide with objects in the environment (e.g., from Mie or Raleigh scattering), a backscattered portion of the signal is reflected back and received by a detector 108. Detector 108 can then send the backscattered portion to a processing system to determine various air data parameters from the acquired data, for example, air speed, temperature, and air density.

FIG. 2 depicts an optical air data system 200 used to determine air data parameters. Air data system 200 functions similarly to air data system 100 with some differences further described herein. Like in FIG. 1, air data system 200 can be implemented on a substrate 202, such as a silicon-based microchip.

In air data system 200, a laser source 204 transmits an optical signal at a frequency to a set of tunable optical filters 206a, 206b, 206c. One of tunable optical filters 206a-206c are configured to pass signals at the frequency of laser source 204. In some embodiments, tunable optical filters 206a-206c are coupled to a respective heater 207a-207c (e.g., microheater). When the microheater is turned on, it heats the tunable optical filter and subsequently changes the frequency at which light can pass through the tunable optical filter. Therefore, when activated, the tunable optical filter can pass the light beams transmitted by laser source 204. As an example, assume that tunable optical filter 206a is heated to match the frequency of laser source 204. In that case, the light from laser source 204 passes through tunable optical filter 206a to an emitting grating coupler 208a, where the light can be emitted into free space. At a later time period, tunable optical filter 206a is no longer heated, and thus the light from laser source 204 no longer passes through tunable optical filter 206a. Instead, tunable optical filter 206b is heated, in which case the light propagates to tunable optical filter 206b where it passes through to an emitting grating coupler 208b. Similarly, the light can propagate to tunable optical filter 206c to an emitting grating coupler 208c when tunable optical filters 206a and 206b are turned off. Activation can be achieved via a controller or processor coupled to the respective heaters.

The backscattered light is received from a grating coupler 210, which sends the backscattered signal to an optical filter array 220 to perform frequency decomposition. A reference signal may be further provided by laser source 204 to optical filter array 220. Optical filter array 220 includes a plurality of optical notch filters 212 that are each coupled to a respective detector 214. Each optical notch filter 212 is configured to pass through a portion of the backscattered signal that corresponds to a particular wavelength or frequency interval. In some embodiments, each optical notch filter 212 passes through a different portion of the spectrum, which enables the spectrum of the backscattered signal to be decomposed into respective portions that are sent to a respective detector 214 for further processing.

For example, assume that receiving grating coupler 210 receives a backscattered signal with a frequency spectrum of 300-800 Hz. Optical notch filter 212 can be configured to pass through a portion of the frequency spectrum from 300 to 320 Hz, while a second optical notch filter can be configured to pass through a portion from 320 Hz to 340 Hz. This way, the backscattered signal spectrum can be cascaded to different optical notch filters until respective portions are passed through an optical notch filter to a respective detector 214. More or less optical notch filters can be added to optical filter array 220 to compensate for total frequency decomposition of a received backscattered signal from receiving grating coupler 210. In addition, while the frequency ranges of each optical notch filter 212 may be of equal distribution (e.g., each optical notch filter 212 passes light at a 50 Hz range), the frequency ranges can also be modified so that the optical notch filters 212 have unequal frequency ranges.

Optical filter array 220 is coupled to a processing system 216 such that the signals received by the plurality of detectors 214 are sent to processing system 216. For example, each detector 214 can be configured to translate the optical signal received from the respective optical notch filter 212 to a corresponding electrical signal, which is received by processing system 216. Processing system 216 may include any one or combination of processors 218, microprocessors, digital signal processors, application specific integrated circuits, field programmable gate arrays, and/or other similar variants thereof. Processing system 216 may also include, or function with, software programs, firmware, or other computer readable instructions for carrying out various process tasks, calculations, and control functions, used in the methods described below. These instructions are typically tangibly embodied on any storage media (or computer readable media) used for storage of computer readable instructions or data structures.

Additionally, processing system 216 may include or be coupled to a memory circuit, such as a memory 230. Memory 230 can include any available storage media (or computer readable medium) that can be accessed by a general purpose or special purpose computer or processor, or any programmable logic device. Suitable computer readable media may include storage or memory media such as semiconductor, magnetic, and/or optical media, and may be embodied as storing instructions in non-transitory computer readable media, such as random access memory (RAM), read-only memory (ROM), non-volatile RAM, electrically-erasable programmable ROM, flash memory, or other storage media. Memory 230 may also include one or more databases to store acquired data.

After processing system 216 receives the signal data from optical filter array 220, processing system 216 can then determine various air data parameters from the received data. In some embodiments, processing system 216 can send the air data parameters to other systems coupled to air data 200, such as a flight management system. Processing system 216 can also send the air data parameters to a user interface, for example a cockpit display. Processing system 216 may optionally store air data parameters in memory 230, which may be accessed at a later time.

FIG. 3 depicts a graphical illustration 300 of the voltage output of a set of three tunable optical filters per time. For example, Filter 1 can correspond to tunable optical filter 206a, Filter 2 can correspond to tunable optical filter 206b, and Filter 3 likewise can correspond to tunable optical filter 206c. When Filter 1 is activated (e.g., heated), the voltage output of Filter 1 increases to a high state as the signal from laser source 204 passes through Filter 1. As clearly shown in FIG. 3, during this same time period neither Filter 2 nor Filter 3 have a high voltage output when Filter 1 is activated. At a second time period, Filter 1 becomes deactivated and Filter 2 becomes activated so that the voltage output in Filter 2 reaches a high state. Finally, at a third time period, Filter 3 becomes activated and reaches a high state while Filters 1 and 2 remain inactive. The process may repeat as necessary in the sequential order described.

Figure 4:
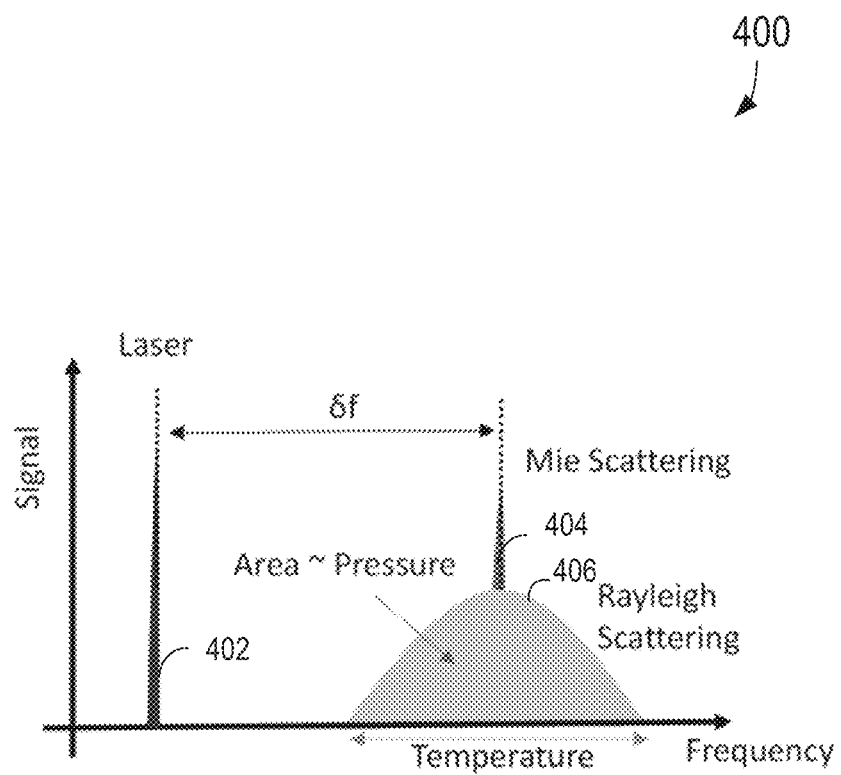
FIG. 4 is a graph depicting the signal strength per frequency of received backscattered signals as described in one or more embodiments.

FIG. 4 depicts a graph 400 of the signal strength per time of emitted and received signals. The left peak 402 corresponds to the signal from the laser while the right peaks are the backscattered signals received from the emitted laser signal. Peak 404 is the frequency shift $6f$ from the resonance frequency of the laser to the backscattered resonance frequency occurring due to Mie scattering with particles in the environment. Peak 406 corresponds to the frequency shift $6f$ from the resonance frequency of the laser as a result of Raleigh scattering with particles in the environment. As shown in FIG. 4, various air data parameters can be determined from the distribution of frequency received by the backscattered signals, such as pressure and temperature measurements.

Figure 5A:
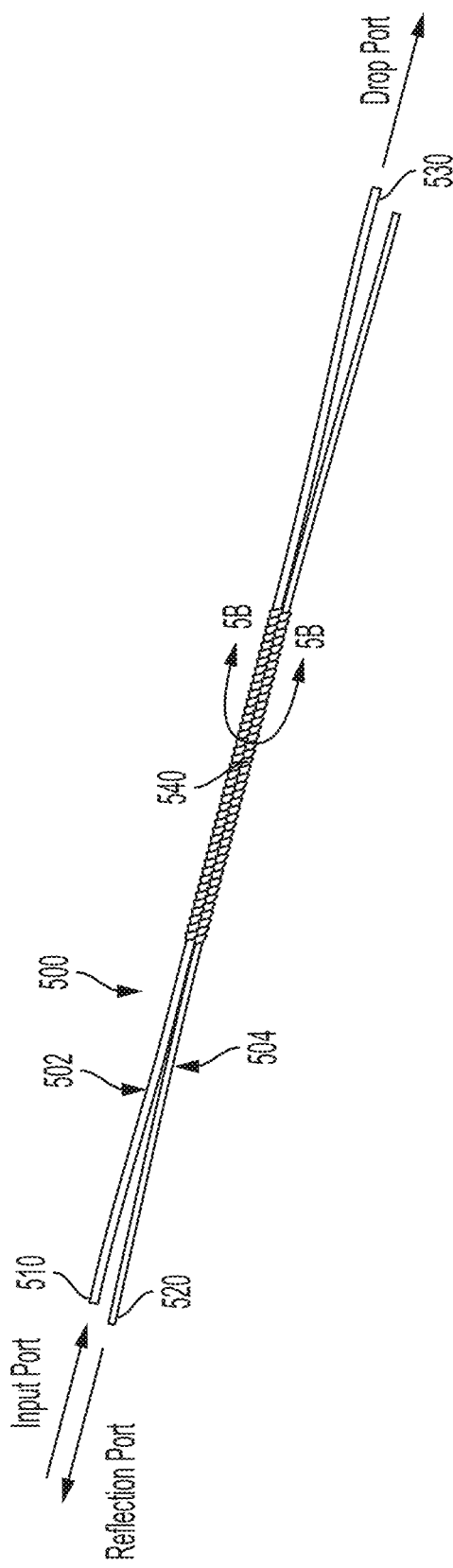
FIG. 5A is a schematic perspective view of an optical notch filter as described in one or more embodiments.
Figure 5B:
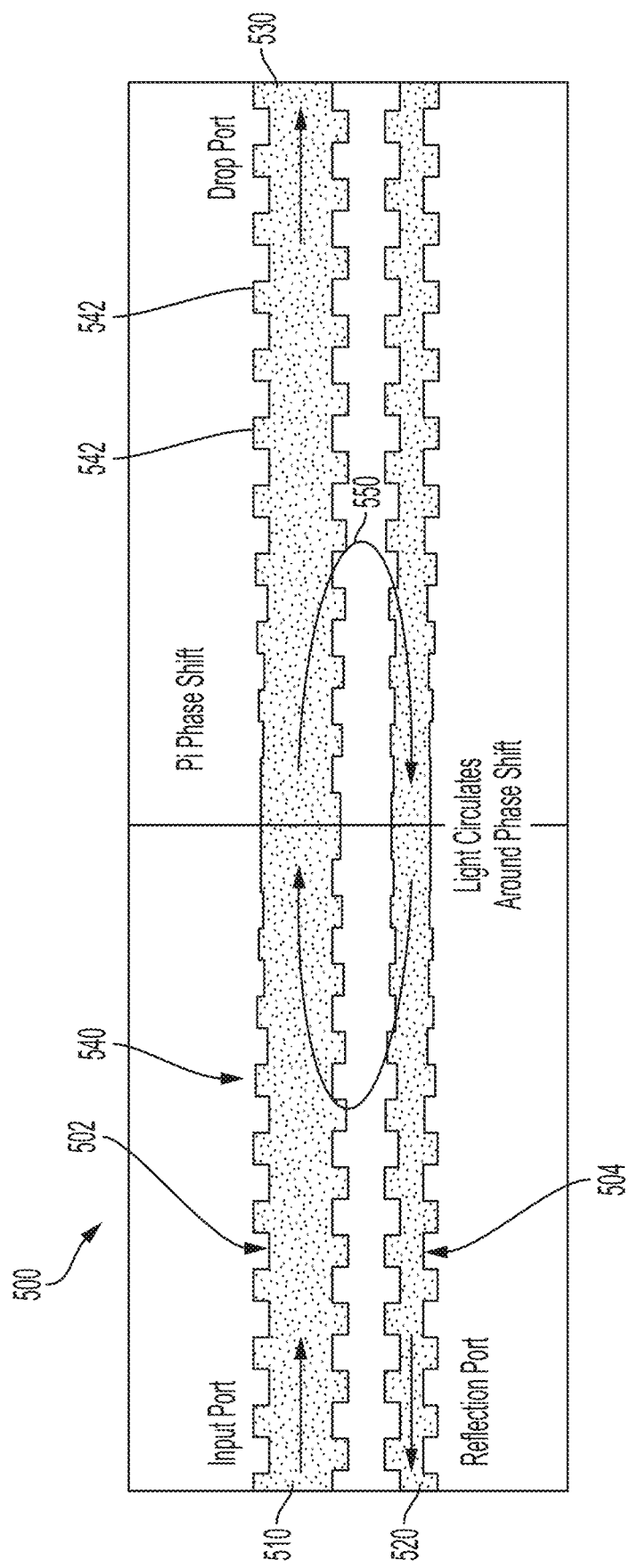
FIG. 5B is an enlarged top view of a portion of the optical notch filter of FIG. 5A.
Figure 5C:
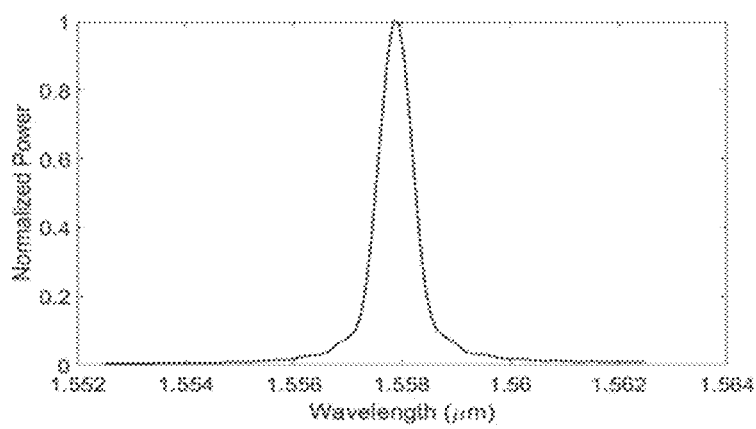
FIG. 5C is a graph depicting the normalized power per wavelength of signals output by the optical notch filter of FIG. 5A.

FIGS. 5A-5C depict the structure and function of an example optical notch filter 500, which can be implemented as optical notch filters 212 used in optical filter array 220. FIG. 5A depicts one representation of the structure of optical notch filter 500. FIG. 5B depicts an enlarged view of a portion of optical notch filter 500. Finally, FIG. 5C depicts a graph illustrating the normalized power per wavelength of the output of optical notch filter 500.

Referring to FIG. 5A, optical notch filter 500 comprises a waveguide structure including a first waveguide 502 and a second waveguide 504. An input port 510 is located at a first end of first waveguide 502, a reflection port 520 is located at a first end of second waveguide 504 adjacent to input port 510, and a drop port 530 is located at an opposite second end of first waveguide 502. A grating-assisted directional coupler 540 is located in a central portion of the waveguide structure between input port 510 and drop port 530. The grating-assisted directional coupler 540 has a periodic grating structure 542 on each of first and second waveguides 502, 504, as shown in FIG. 5B.

The optical notch filter 500 is configured to receive light injected into input port 510, which directs the light to grating-assisted directional coupler 540. At the center of periodic grating structure 542 (FIG. 5B), a pi phase shift in the phase of the modulation employed to create the grating structure generates a tightly confined light field 550 at the resonance wavelength, with the light circulating around the pi phase shift. A pi phase shift is an abrupt change in the phase of the modulation that defines the grating. In other words, a pi phase shift is an abrupt change in a spatial pattern of the waveguide modulation, such that a periodic structure of the waveguide modulation is shifted in spatial phase by pi radians on either side of an interface.

As shown in FIG. 5B the pi phase shift generating the tightly confined light field at the resonance wavelength of the signal enables the signal to pass to the drop port 530. All other wavelengths will exit through the reflection port 520.

Referring to FIG. 5C, the peak illustrated in the graph represents the portion of the signal passing through example optical notch filter 500. The normalized power then exponentially decays as the frequency (and wavelength) of the signal spectrum increases or decreases from the resonance frequency.

Further details regarding exemplary optical notch filters that can be used in the embodiments disclosed herein are described in U.S. Pat. No. 10,788,340, the disclosure of which is incorporated by reference.

Figure 6A:
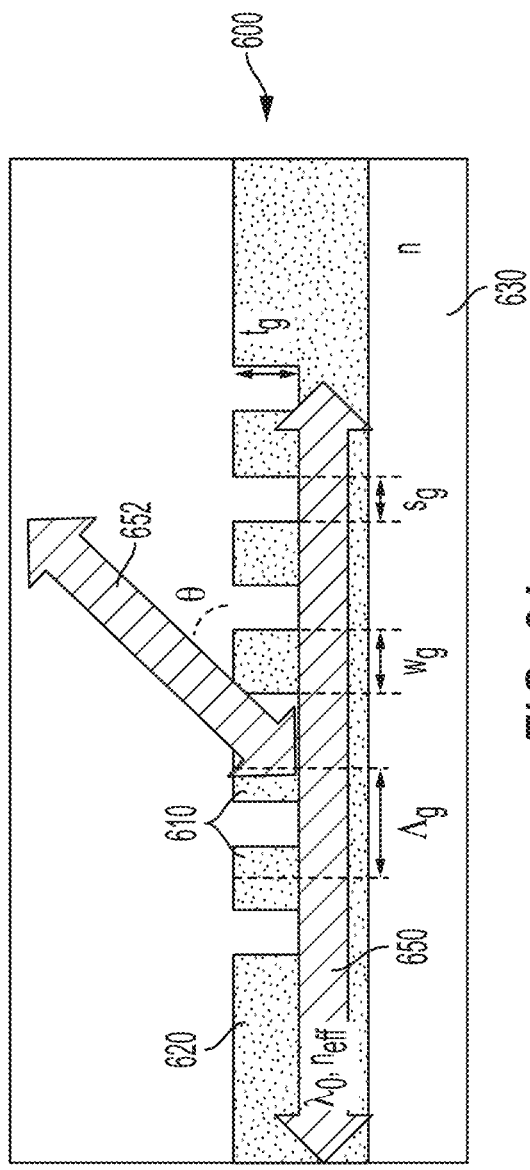
FIG. 6A is a cross-sectional side view of a grating coupler, according to an exemplary embodiment, which can be implemented as part of an air data system.

FIG. 6A is a cross-sectional side view of a grating coupler 600, such as an SiP grating coupler, which can be utilized as the grating couplers in air data system 200 described previously. The grating coupler 600 includes a periodic grating structure 610, which is formed as part of a waveguide layer 620 that is composed of a higher refractive index material. The periodic grating structure 610 and waveguide layer 620 are embedded in a cladding layer 630, which is composed of a lower refractive index material.

FIG. 6A illustrates the design parameters of grating coupler 600, which is based on the following equation:

$$\frac{2\pi n}{\lambda_0}\sin(\theta) = \frac{2\pi n_{eff}}{\lambda_0} - \frac{2\pi}{\Lambda_g}$$

where n is the refractive index of the cladding material, $\lambda_0$ is the wavelength of the input light, $n_{eff}$ is the effective refractive index of the grating material, $\theta$ is the angle of the diffracted light, and $\Lambda_g$ is the spatial period of the grating structure. As further shown in FIG. 6A, $w_g$ is the width of a single periodic grating structure, $s_g$ is the space between adjacent periodic grating structures, and $t_g$ is the thickness of each periodic grating structure. The periodic grating structure 610 is formed to preferentially diffract an input in-plane light beam 650 in a direction of interest at a selected angle as a diffracted light beam 652. For a given wavelength, this diffraction angle can cover nearly the entire 180 degree angular space above a chip where grating coupler 600 is located. As a reciprocal device, the grating coupler can additionally receive specific-wavelength light from a given angle of interest.

Accordingly, in some embodiments, grating coupler 600 can be incorporated into a chip to diffract in-plane light from a waveguide to out-of-plane, or to receive out-of-plane light that is coupled into an in-plane waveguide.

Figure 6B:
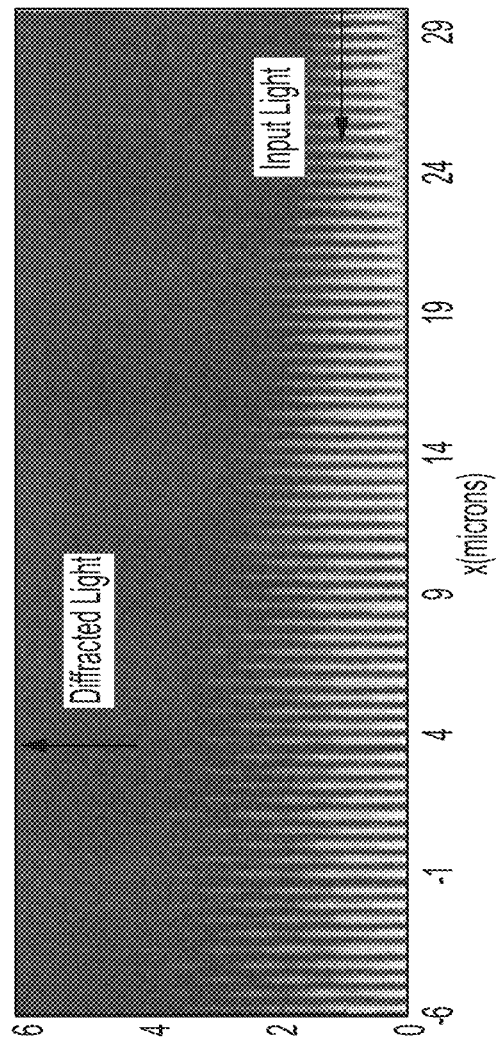
FIG. 6B is a modeled graphical representation of the simulated performance of the grating coupler of FIG. 6A.

FIG. 6B is a modeled graphical representation of the simulated performance of grating coupler 600 such as an SiP grating coupler. FIG. 6B shows the input light propagating along the grating as well as the significantly weaker, diffracted light field. The diffracted light field may become stronger relative to the propagating field, reducing required grating size, by increasing the grating coefficient. This may in turn be done by increasing the etch depth of the grating.

Figure 7:
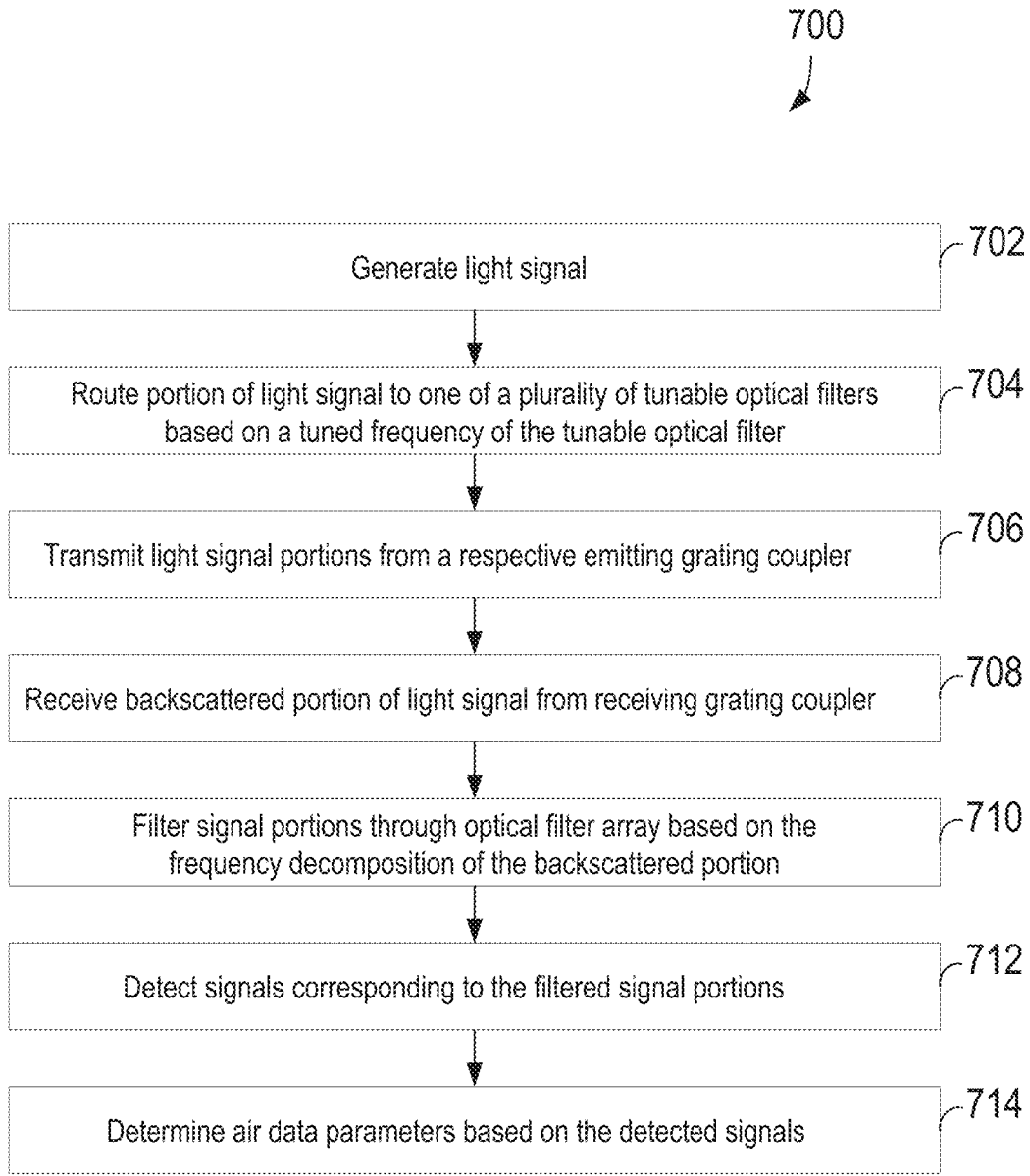
FIG. 7 is a flow chart depicting a method for determining air data parameters based on emitted signals as described in one or more embodiments.

FIG. 7 is a flow chart of a method 700 for determining air data parameters Method 700 may be implemented via the techniques described with respect to FIGS. 1-6, but may be implemented via other techniques as well. The blocks of the flow diagram have been arranged in a generally sequential manner for ease of explanation; however, it is to be understood that this arrangement is merely exemplary, and it should be recognized that the processing associated with the methods described herein (and the blocks shown in the Figures) may occur in a different order (for example, where at least some of the processing associated with the blocks is performed in parallel and/or in an event-driven manner).

Method 700 begins at block 702 by generating a light signal. The light signal can be generated from a continuous wave laser that is time-multiplexed. From block 702 method 700 proceeds to block 704 by routing at least a portion of the light signal to one of a plurality of tunable optical filters based on a tuned frequency of the tunable optical filter. When the tunable optical filters are tuned to match the resonant frequency of the laser, the light signal can pass through the tuned optical filter. However, when the tunable optical filters are not tuned (e.g., in an inactive default state), the light signal will be blocked from passing through the optical filter and instead propagate to a tuned optical filter. Thus, only one optical filter should be tuned at a given time.

Method 700 then proceeds to block 706 by transmitting the light signal portions from a respective emitting grating coupler that is coupled to a respective tunable optical filter. The emitting grating couplers can be configured to transmit the light signal portion into free space in a specified direction. In exemplary embodiments the emitting grating couplers are positioned so as to transmit the light signal portions into different directions from one another.

Proceeding next to block 708, method 700 then receives a backscattered portion of the light signals from a receiving grating coupler. At block 710, method 700 filters the signal portions through an optical filter array based on the frequency (or wavelength) decomposition of the backscattered portion. As described above, the optical filter array includes a plurality of optical notch filters that are each coupled to a detector. The optical filter array can perform frequency decomposition of the received backscattered portions by configuring each optical notch filter in the array at a distinct frequency (or wavelength) range. The frequency or wavelength of the backscattered portions that fall within the range can pass through the optical notch filter, while those that do not can be cascaded through the optical filter array until they are propagated to the appropriate optical notch filter.

Method 700 then proceeds to block 712 by detecting signals corresponding to the filtered signal portions from each detector in the optical filter array. The filtered signals can then be sent to a processing system coupled to the optical filter array.

Method 700 then proceeds to block 714 by determining air data parameters based on the detected signals. Such air data parameters can include air speed, temperature, pressure, and air density.

The methods and techniques described herein may be implemented in digital electronic circuitry, or with a programmable processor (for example, a special-purpose processor or a general-purpose processor such as a computer) firmware, software, or in various combinations of each. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instruction to, a data storage system, at least one input device, and at least one output device.

Generally, a processor will receive instructions and data from a read-only memory and/or a random-access memory. Storage devices suitable for tangibly embodying computer program instructions and data include all forma of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed ASICs.

The terms "approximately" or "substantially" mean that the value or parameter specified may be somewhat altered, as long as the alteration does not result in nonconformance of the process or structure to the illustrated embodiment from the perspective of one having ordinary skill in the art. Finally, the term "exemplary" merely indicates the accompanying description is used as an example, rather than implying an ideal, essential, or preferable feature of the invention.

EXAMPLE EMBODIMENTS

Example 1 includes an integrated photonics chip, comprising: a photonics substrate; a laser source operatively coupled to the photonics substrate, the laser source operative to emit a light beam; a plurality of tunable optical filters on the photonics substrate, the tunable optical filters in optical communication with each other and with the laser source; a plurality of emitting grating couplers on the photonics substrate, the emitting grating couplers each respectively coupled to an output of one of the tunable optical filters, wherein each emitting grating coupler is configured to emit the light beam received from the output of the respective tunable optical filter into a region of interest in different directions; at least one receiving grating coupler on the photonics substrate, the receiving grating coupler configured to receive scattered light from the region of interest; and a passive optical filter array on the photonics substrate and in optical communication with the receiving grating coupler, the passive optical filter array configured to receive the scattered light from the receiving grating coupler, wherein the passive optical filter array comprises a plurality of optical notch filters operative for frequency selection and a plurality of optical detectors each respectively coupled to an output of one of the optical notch filters, wherein each of the optical notch filters is configured to pass the received scattered light at a corresponding wavelength range to a respective one of the optical detectors, wherein each corresponding wavelength range is distinct, wherein the passive optical filter array is operative to perform frequency spectrum decomposition of the received scattered light into a plurality of signals; wherein the light beam emitted from the laser source is routed to one or more of the tunable optical filters, which are operative to allow transmission of the light beam to one of the emitting grating couplers at any given time, such that the light beam is emitted into the region of interest at different times from each of the emitting grating couplers.

Example 2 includes the integrated photonics chip of Example 1, further comprising a plurality of microheaters coupled to the plurality of tunable optical filters, wherein the plurality of microheaters are configured to heat the plurality of tunable optical filters such that a resonance frequency of a respective tunable optical filter matches a resonance frequency of the laser source.

Example 3 includes the integrated photonics chip of Example 2, further comprising a controller coupled to the plurality of microheaters, wherein the controller is configured to selectively activate or disactivate each microheater such that only one microheater is activated at a time period.

Example 4 includes the integrated photonics chip of any of Examples 1-3, further comprising a processing system coupled to the passive optical filter array, wherein the processing system receives the plurality of signals, and wherein the processing system comprises one or more processors configured to determine at least one air data parameter based on the received plurality of signals.

Example 5 includes the integrated photonics chip of Example 4, wherein the at least one air data parameter comprises at least one of air speed, pressure, temperature, and air density.

Example 6 includes the integrated photonics chip of any of Examples 1-5, wherein the laser source is configured to generate a continuous wave signal that is time-multiplexed.

Example 7 includes the integrated photonics chip of any of Examples 1-6, wherein the laser source is configured to transmit a reference signal to the passive optical filter array.

Example 8 includes the integrated photonics chip of any of Examples 1-7, wherein each of the plurality of optical notch filters comprise a waveguide structure including a first waveguide and a second waveguide, the waveguide structure comprising: an input port located at a first end of the first waveguide; a reflection port located at a first end of the second waveguide and adjacent to the input port; a drop port located at an opposite second end of the first waveguide; and a grating-assisted directional coupler located in a central portion of the waveguide structure between the input port and the drop port, the grating-assisted directional coupler including a periodic grating structure on each of the first and second waveguides.

Example 9 includes the integrated photonics chip of Example 8, wherein: the first waveguide is configured to receive light injected into the input port and direct the light to the grating-assisted directional coupler; and the periodic grating structure of the grating-assisted directional coupler is configured to produce a pi phase shift, which is an abrupt change in a spatial pattern of waveguide modulation, such that a periodic structure of the waveguide modulation is shifted in spatial phase by pi radians on either side of an interface, that generates a confined field of the light at a resonance wavelength, with the light circulating around the pi phase shift; wherein a selected wavelength of the light is transmitted to the drop port, and all other wavelengths of the light exit through the reflection port.

Example 10 includes an optical air data system, comprising: a light emission system, comprising: a laser source operative to emit a light beam; a plurality of tunable optical filters in optical communication with each other and with the laser source; a plurality of emitting grating couplers each respectively coupled to an output of one of the tunable optical filters, wherein each emitting grating coupler is configured to emit the light beam received from the output of the respective tunable optical filter into a region of interest in different directions; and a controller coupled to the plurality of tunable optical filters, wherein the controller is configured to activate a tunable optical filter such that the activated tunable optical filter is operative to allow transmission of the light beam to a corresponding emitting grating coupler during a given time period; an air data detection system in operative communication with the light emission system, the air data detection system comprising: at least one receiving grating coupler configured to receive scattered light from the region of interest; and a passive optical filter array in optical communication with the receiving grating coupler, the passive optical filter array configured to receive the scattered light from the receiving grating coupler, wherein the passive optical filter array comprises a plurality of optical notch filters operative for frequency selection and a plurality of optical detectors each respectively coupled to an output of one of the optical notch filters, wherein each of the optical notch filters is configured to pass the received scattered light at a corresponding frequency range to a respective one of the optical detectors, wherein each corresponding frequency range is distinct, wherein the passive optical filter array is operative to perform frequency spectrum decomposition of the received scattered light into a plurality of signals; and a processing system operatively coupled to the air data detection system, the processing system configured to receive the plurality of signals, and wherein the processing system is operative to determine at least one air data parameter based on the received plurality of signals.

Example 11 includes the optical air data system of Example 10, wherein the light emission system and the air data detection system are on a silicon microchip.

Example 12 includes the optical air data system of any of Examples 10-11, wherein the light emission system further comprises a plurality of microheaters coupled to the plurality of tunable optical filters, wherein the plurality of microheaters are configured to heat the plurality of tunable optical filters such that a resonance frequency of a respective tunable optical filter matches a resonance frequency of the laser source.

Example 13 includes the optical air data system of Example 12, wherein the controller is coupled to the plurality of microheaters and configured to selectively activate or disactivate each tunable optical filter such that the light beam is emitted into the region of interest at different times from each of the emitting grating couplers.

Example 14 includes the optical air data system of any of Examples 10-13, wherein the processing system comprises one or more processors configured to determine more than one air data parameter based on the received plurality of signals.

Example 15 includes the optical air data system of Example 14, wherein the more than one air data parameter comprises air speed, pressure, temperature, or air density.

Example 16 includes the optical air data system of any of Examples 10-15, wherein the laser source is configured to generate a continuous wave signal that is time-multiplexed.

Example 17 includes the optical air data system of any of Examples 10-16, wherein the laser source is configured to transmit a reference signal to the air data detection system.

Example 18 includes the optical air data system of any of Examples 10-17, wherein the light emission system comprises a light detection and ranging (lidar) system.

Example 19 includes the optical air data system of any of Examples 10-18, wherein each of the plurality of optical notch filters comprise a waveguide structure including a first waveguide and a second waveguide, the waveguide structure comprising: an input port located at a first end of the first waveguide; a reflection port located at a first end of the second waveguide and adjacent to the input port; a drop port located at an opposite second end of the first waveguide; and a grating-assisted directional coupler located in a central portion of the waveguide structure between the input port and the drop port, the grating-assisted directional coupler including a periodic grating structure on each of the first and second waveguides.

Example 20 includes a method, comprising: generating an optical signal; routing the optical signal to a plurality of tunable optical filters, wherein the optical signal is routed to each of the plurality of tunable optical filters at a different time period; transmitting the optical signal from each of the plurality of tunable optical filters to a region of interest such that the optical signal is emitted into the region of interest at different times; receiving a backscattered signal based on the transmitted optical signal; filtering the backscattered signal into a plurality of filtered signal portions based on a frequency or wavelength decomposition of the backscattered signal; detecting the plurality of filtered signal portions; and determining at least one air data parameter based on the detected filtered signal portions.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. An integrated photonics chip, comprising:
   a photonics substrate;
   a laser source operatively coupled to the photonics substrate, the laser source operative to emit a light beam;
   a plurality of tunable optical filters on the photonics substrate, the tunable optical filters in optical communication with each other and with the laser source;
   a plurality of emitting grating couplers on the photonics substrate, the emitting grating couplers each respectively coupled to an output of one of the tunable optical filters, wherein each emitting grating coupler is configured to emit the light beam received from the output of the respective tunable optical filter into a region of interest in different directions;
   at least one receiving grating coupler on the photonics substrate, the receiving grating coupler configured to receive scattered light from the region of interest; and
   a passive optical filter array on the photonics substrate and in optical communication with the receiving grating coupler, the passive optical filter array configured to receive the scattered light from the receiving grating coupler, wherein the passive optical filter array comprises a plurality of optical notch filters operative for frequency selection and a plurality of optical detectors each respectively coupled to an output of one of the optical notch filters, wherein each of the optical notch filters is configured to pass the received scattered light at a corresponding wavelength range to a respective one of the optical detectors, wherein each corresponding wavelength range is distinct, wherein the passive optical filter array is operative to perform frequency spectrum decomposition of the received scattered light into a plurality of signals;
   wherein the light beam emitted from the laser source is routed to one or more of the tunable optical filters, which are operative to allow transmission of the light beam to one of the emitting grating couplers at any given time, such that, the light beam is emitted into the region of interest at different times from each of the emitting grating couplers.

2. The integrated photonics chip of claim 1, further comprising a plurality of microheaters coupled to the plurality of tunable optical filters, wherein the plurality of microheaters are configured to heat the plurality of tunable optical filters such that a resonance frequency of a respective tunable optical filter matches a resonance frequency of the laser source.

3. The integrated photonics chip of claim 2, further comprising a controller coupled to the plurality of microheaters, wherein the controller is configured to selectively activate or disactivate each microheater such that only one microheater is activated at a time period.

4. The integrated photonics chip of claim 1, further comprising a processing system coupled to the passive optical filter array, wherein the processing system receives the plurality of signals, and wherein the processing system comprises one or More processors configured to determine at least one air data parameter based on the received plurality of signals.

5. The integrated photonics chip of claim 4, wherein the at least one air data parameter comprises at least one of air speed, pressure, temperature, and air density.

6. The integrated photonics chip of claim 1, wherein the laser source is configured to generate a continuous wave signal that is time-multiplexed.

7. The integrated photonics chip of claim 1, wherein the laser source is configured to transmit a reference signal to the passive optical filter array.

8. The integrated photonics chip of claim 1, wherein each of the plurality of optical notch filters comprise a waveguide structure including a first waveguide and a second waveguide, the waveguide structure comprising:
an input port located at a first end of the first waveguide;
a reflection port located at a first end of the second waveguide and adjacent to the input port;
a drop port located at an opposite second end of the first waveguide; and
a grating-assisted directional coupler located in a central portion of the waveguide structure between the input port and the drop port, the grating-assisted directional coupler including a periodic grating structure on each of the first and second waveguides.

9. The integrated photonics chip of claim 8, wherein:
the first waveguide is configured to receive light injected into the input port and direct the light to the grating-assisted directional coupler; and
the periodic grating structure of the grating-assisted directional coupler is configured to produce a pi phase shift, which is an abrupt change in a spatial pattern of waveguide modulation, such that a periodic structure of the waveguide modulation is shifted in spatial phase by pi radians on either side of an interface, that generates a confined field of the light at a resonance wavelength, with the light circulating around the pi phase shift;
wherein a selected wavelength of the light is transmitted to the drop port, and all other wavelengths of the light exit through the reflection port.

10. An optical air data system, comprising:
a light emission system, comprising:
a laser source operative to emit a light beam;
a plurality of tunable optical filters in optical communication with each other and with the laser source;
a plurality of emitting grating couplers each respectively coupled to an output of one of the tunable optical filters, wherein each emitting grating coupler is configured to emit the light beam received from the output of the respective tunable optical filter into a region of interest in different directions; and
a controller coupled to the plurality of tunable optical filters, wherein the controller is configured to activate a tunable optical filter such that the activated tunable optical filter is operative to allow transmission of the light beam to a corresponding emitting grating coupler during a given time period;
an air data detection system in operative communication with the light emission system, the air data detection system comprising:
at least one receiving grating coupler configured to receive scattered light from the region of interest; and
a passive optical filter array in optical communication with the receiving grating coupler, the passive optical filter array configured to receive the scattered light from the receiving grating coupler, wherein the passive optical filter array comprises a plurality of optical notch filters operative for frequency selection and a plurality of optical detectors each respectively coupled to an output of one of the optical notch filters, wherein each of the optical notch filters is configured to pass the received scattered light at a corresponding frequency range to a respective one of the optical detectors, wherein each corresponding frequency range is distinct, wherein the passive optical filter array is operative to perform frequency spectrum decomposition of the received scattered light into a plurality of signals; and
a processing system operatively coupled to the air data detection system, the processing system configured to receive the plurality of signals, and wherein the processing system is operative to determine at least one air data parameter based on the received plurality of signals.

11. The optical air data system of claim 10, wherein the light emission system and the air data detection system are on a silicon microchip.

12. The optical air data system of claim 10, wherein the light emission system further comprises a plurality of microheaters coupled to the plurality of tunable optical filters, wherein the plurality of microheaters are configured to heat the plurality of tunable optical filters such that a resonance frequency of a respective tunable optical filter matches a resonance frequency of the laser source.

13. The optical air data system of claim 12, wherein the controller is coupled to the plurality of microheaters and configured to selectively activate or disactivate each tunable optical filter such that the light beam is emitted into the region of interest at different times from each of the emitting grating couplers.

14. The optical air data system of claim 10, wherein the processing system comprises one or more processors configured to determine more than one air data parameter based on the received plurality of signals.

15. The optical air data system of claim 14, wherein the more than one air data parameter comprises air speed, pressure, temperature, or air density.

16. The optical air data system of claim 10, wherein the laser source is configured to generate a continuous wave signal that is time-multiplexed.

17. The optical air data system of claim 10, wherein the laser source is configured to transmit a reference signal to the air data detection system.

18. The optical air data system of claim 10, wherein the light emission system comprises a light detection and ranging (lidar) system.

19. The optical air data system of claim 10, wherein each of the plurality of optical notch filters comprise a waveguide structure including a first waveguide and a second waveguide, the waveguide structure comprising:
- an input port located at a first end of the first waveguide;
- a reflection port located at a first end of the second waveguide and adjacent to the input port;
- a drop port located at an opposite second end of the first waveguide; and
- a grating-assisted directional coupler located in a central portion of the waveguide structure between the input port and the drop port, the grating-assisted directional coupler including a periodic grating structure on each of the first and second waveguides.

* * * * *